(12) United States Patent
Craane et al.

(10) Patent No.: US 12,215,532 B2
(45) Date of Patent: Feb. 4, 2025

(54) PINCH DETECTION SYSTEM

(71) Applicant: Inalfa Roof Systems Group B.V., Oostrum (NL)

(72) Inventors: Dennie Wilhelmus Hendrikus Craane, Nijmegen (NL); Sergej Sergeevic Lojko, Lottum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 203 days.

(21) Appl. No.: 17/729,555

(22) Filed: Apr. 26, 2022

(65) Prior Publication Data

US 2022/0349233 A1 Nov. 3, 2022

(30) Foreign Application Priority Data

Apr. 29, 2021 (EP) ..................................... 21171330

(51) Int. Cl.
*B60J 7/057* (2006.01)
*E05F 15/44* (2015.01)

(52) U.S. Cl.
CPC ........... *E05F 15/443* (2015.01); *B60J 7/0573* (2013.01); *E05Y 2900/542* (2013.01)

(58) Field of Classification Search
CPC .......... B60J 7/057; B60J 7/0573; E05F 15/40; E05F 15/42; E05F 15/443
USPC ........................................ 296/223; 49/26–28
See application file for complete search history.

(56) References Cited

U.S. PATENT DOCUMENTS

| 11,221,202 B2* | 1/2022 | Dietz ................... A61B 5/1071 |
| 2010/0156440 A1 | 6/2010 | Weingärtner et al. |
| 2020/0124397 A1 | 4/2020 | Dietz |

FOREIGN PATENT DOCUMENTS

| DE | 4201019 A1 | 7/1993 |
| DE | 10151840 A1 | 5/2003 |
| DE | 202005012636 U1 | 12/2006 |

OTHER PUBLICATIONS

European Search Report in corresponding patent application No. 21171330.0 dated Oct. 19, 2021.

* cited by examiner

*Primary Examiner* — Dennis H Pedder
(74) *Attorney, Agent, or Firm* — Steven M Kochler; Westman, Champlin & Koehler, P.A.

(57) ABSTRACT

An open-roof assembly is configured for covering or at least partly uncovering an opening in a vehicle roof. The open-roof assembly comprises a frame defining the opening, a moveably arranged closure member and a pressure-sensitive sensor device. The open-roof assembly comprises a closed state, in which the closure member covers the opening in the vehicle roof, and an open state, in which the closure member uncovers the roof opening at least partly. The pressure-sensitive sensor device is arranged between the closure member and the frame for detecting presence of an object between the closure member and the frame, at least when the closure member is moving from the open state towards the closed state. The pressure-sensitive sensor device extends over a device length and is configured to detect a location of a local pressure, which local pressure is exerted locally on the pressure-sensitive sensor device, along the device length.

4 Claims, 4 Drawing Sheets

PINCH DETECTION SYSTEM

BACKGROUND

The discussion below is merely provided for general background information and is not intended to be used as an aid in determining the scope of the claimed subject matter.

The invention relates to a pinch detection system for detecting a pinch of an object between a moveably arranged closure member of an open-roof assembly and an edge of a roof opening. Further, the invention relates to a corresponding method of detecting a pinch.

An open-roof assembly is well-known. The open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastics. The closure member may be configured to tilt or to slide.

During a movement, i.e. a tilting movement or a sliding movement, a foreign object may become trapped between an edge of the opening in the vehicle roof and the moving closure member. In order to prevent damage to the closure member and the trapped object, it is known to provide a pinch detection system. Such a pinch detection system is intended to detect a pinch with a foreign object as soon as possible and to reverse a movement to ensure safe release of the foreign object. A pinch needs to be detected as soon as possible such that a force exerted on the foreign object is kept as small as possible. Further, legal requirements applicable in certain jurisdictions limit the maximum force under specified conditions.

Several different pinch detection system are known. One of the known kinds of pinch detection systems is an indirect system, wherein a property of the open-roof system is detected, when the closure member is moving. The detected property is immediately analysed and an unexpected value of the property may be used to determine that a pinch has occurred.

A pinch detection system needs to be able to detect a pinch with any foreign object irrespective of properties of the foreign object. Indirect pinch detection systems need to designed with different kind of properties of foreign objects in mind. In particular, a stiffness or compression rate of the object needs to be considered. The stiffer the object, i.e. the higher the compression rate of the object, the faster an exerted force increases with displacement of the closure member. The stiffness or compression rate may be represented with a spring rate expressed in N/mm. With a soft object having a relatively small spring rate, e.g. a spring rate of about 10 or about 20 N/mm, the closure member may move over a small distance before a maximum pinch force of e.g. 100 N is reached, giving the pinch detection system a small period of time to accurately detect whether a pinch actually has occurred. Thus, it is possible to prevent too frequent false pinch detections. However, with a hard object having a relatively large spring rate, e.g. about 65 N/mm, there is less time available and reliable detection becomes more challenging.

Another known embodiment of a pinch detection system comprises a direct detection. For example, a pressure sensitive sensor is provided along an edge of the moveably arranged closure member or along an edge of the roof opening. Usually, the known pressure sensitive sensor functions like a switch, wherein upon application of sufficient pressure, two electrodes are brought into electrical contact. In another known embodiment, a capacitive measurement is performed. In a particular embodiment thereof, an approaching object may be detected when it is nearby, but not yet touching.

The known direct pinch detection systems are relatively simple in the sense that they only provide an output indicating that a pinch occurred or is about to occur. Thus, the sensor adds costs to the open-roof assembly for pinch detection. In normal use, however, such pinch detection system does not add functionality or any improved user experience. Therefore, such costs are commercially not feasible and, as a result, the known direct pinch detection systems are commonly omitted and the indirect pinch detection systems are used instead. Still, as above described, reliable detection of a pinch with a hard object may be challenging for an indirect pinch detection system and a direct pinch detection system may sometimes be preferred over an indirect pinch detection system.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The present invention provides a direct pinch detection system that reliably and timely detects a pinch with an object and that is commercially feasible.

In a first aspect, an open-roof assembly for covering or at least partly uncovering an opening in a vehicle roof comprises a frame defining the opening, a closure member moveably arranged on the frame and a pressure-sensitive sensor device. The open-roof assembly comprises a closed state, in which the closure member covers the opening in the vehicle roof, and an open state, in which the closure member uncovers the roof opening at least partly. The pressure-sensitive sensor device is arranged between the closure member and the frame for detecting presence of an object between the closure member and the frame, at least when the closure member is moving from the open state towards the closed state. The pressure-sensitive sensor device extends over a sensor device length and is configured to detect a location of a local pressure, which local pressure is exerted locally on the pressure-sensitive sensor device, along the sensor device length.

Instead of merely detecting a pinch by detecting an exerted pressure on the pressure-sensitive device, the pressure-sensitive device is configured to detect a location of the exerted pressure along its length. Thus, more information is obtained when an object touches the pressure-sensitive device. Such additional information may be used to provide further functionality other than for merely detecting a pinch as described in more detail hereinafter in the description of certain embodiments.

The pressure-sensitive device may be technically provided by one or more of a number of embodiments employing generally known methods and techniques. For example, a number of individually pressure-sensitive switches may be arranged in an elongated array or a number of capacitive sensors may be applied.

In an embodiment of the open-roof assembly, the pressure-sensitive sensor device is configured to detect a local deformation due to the local pressure exerted on the pressure-sensitive sensor device. In this embodiment, a local pressure is detected, including the location and a local deformation, which may provide information regarding shape or size of an object exerting the pressure. In an exemplary embodiment of a sensor detecting a local deformation employs capacitive sensing. An example of such a sensor is disclosed in US2020124397, which is incorporated by reference herein in its entirety. The disclosed sensor comprises a reference strip and a sliding strip, separated from each other by a spacer. Electrodes are located on the reference strip and the sliding strip. Bending of the sensor results in shifting of the sliding strip with respect to the reference strip. Measurements obtained from the electrodes show such shifting. Due to the presence of multiple electrodes, a location of the exerted pressure is detectable and a local deformation can be derived from the measurements.

In a further particular embodiment, the closure member is tiltably arranged and the pressure-sensitive sensor device, configured for detecting a local deformation, is arranged and configured to detect a hinge angle between the frame and the closure member. For example, the pressure-sensitive device may be arranged extending between the frame and the closure member such that the pressure-sensitive sensor device forms a substantially right angle, which is detectable by the pressure-sensitive sensor. Upon tilting the closure member, a part of the pressure-sensitive sensor device coupled to the closure member is moved away from the frame, due to which the pressure-sensitive sensor device no longer forms a right angle, but an obtuse angle. The change in angle is detectable by the pressure-sensitive sensor device. A tilt angle between the frame and the closure member may be derived from the change in angle of the pressure-sensitive sensor device. In this embodiment, a pressure sensitive sensor device for detecting a pinched or trapped object is advantageously further used for detecting a tilt angle of the closure member, thereby enabling to omit or simplify any other position detection system, which improves a cost-effectiveness of the pressure-sensitive sensor device.

In an embodiment of the open-roof assembly, the pressure-sensitive sensor device is integrated with a compressible seal arranged along a perimeter of the opening in the frame. As well known in the art, a compressible seal may be provided along a perimeter of the opening in the frame, for example for reducing noise when the open-roof assembly is in the closed state. The pressure-sensitive sensor device may be arranged in a compartment of the compressible seal, may be arranged on a surface of the compressible seal or may be integrated in the compressible seal. While, in this embodiment, the pressure-sensitive sensor device is arranged on the frame, in another embodiment, the pressure-sensitive sensor device may be arranged on the closure member.

In an embodiment of the open-roof assembly, the pressure-sensitive sensor device is configured to detect a position of the moveably arranged closure member. As above-mentioned, a tilt angle may be detected. In another embodiment, a pressure may be exerted on the pressure-sensitive sensor device when the open-roof assembly is in the open state. For example, a protruding element, e.g. a roller on an extending arm, may be configured to push on the pressure-sensitive sensor device when the closure member is in its position of the open state. In a particular embodiment thereof, the closure member is slidably arranged and wherein the closure member exerts locally a pressure on the pressure-sensitive sensor device, when the open-roof assembly is in the open state. For example, in a known embodiment of an open-roof assembly, the closure member is first tilted and then slides. After the tilting movement, an edge of the closure member may still be at a level of the pressure-sensitive sensor device and may thus locally push the pressure-sensitive sensor device, while the closure member slides. Hence, another position detection system may be omitted or simplified.

In an embodiment of the open-roof assembly, the pressure-sensitive sensor device is arranged such that an occupant of the vehicle is enabled to touch the pressure-sensitive sensor device in at least one of the closed state and the open state for operating at least one function of the open-roof assembly. With the localized detection enabled with the pressure-sensitive sensor device, a human-machine interface may be provided. Detecting the touch of an object like a human finger, or the like, at a specific location along the sensor length may be interpreted as a command, for example to open or to close the closure member. In particular for use in the closed state, the pressure-sensitive sensor device may need to be arranged such that pressure may be exerted even when the closure member is arranged in contact with or close to the pressure-sensitive sensor device.

In an embodiment of the open-roof assembly, the open-roof assembly further comprises a control unit, the control unit being configured to control the open-roof assembly in accordance with an operating parameter and being configured to execute an indirect pinch detection, wherein the control unit is configured to adapt the operating parameter upon detection of a locally exerted pressure on the pressure-sensitive sensor device. While the pressure-sensitive sensor device may be used for preventing a pinch or entrapment, a further pinch detection system may be present as well. In particular, an indirect detection method may be present. In a practical exemplary embodiment, the operating parameter may be a speed of the closure member during a closing movement, i.e. when moving from the open state towards the closed state. If pressure is exerted on the pressure-sensitive sensor device at a location away from an edge of the moving closure member, the speed of the closure member may be reduced, possibly combined with a kind of warning signal. In another embodiment, the operating parameter may relate to the indirect pinch detection system. For example, as mentioned above, the indirect detection system may comprise a threshold that is configured relatively high to prevent accidental incorrect pinch detection. When pressure is exerted on the pressure-sensitive sensor device, the threshold may be lowered in order to timely detect an actual pinch situation.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from description provided herein with reference to the appended schematical drawings, if needed.

DETAILED DESCRIPTION OF THE ILLUSTRATIVE EMBODIMENTS

Figure 1A:
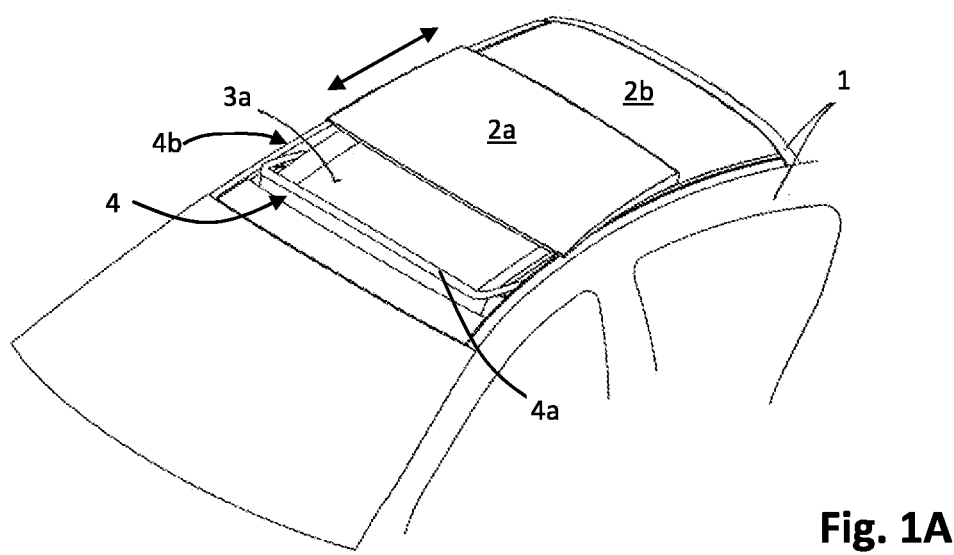
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
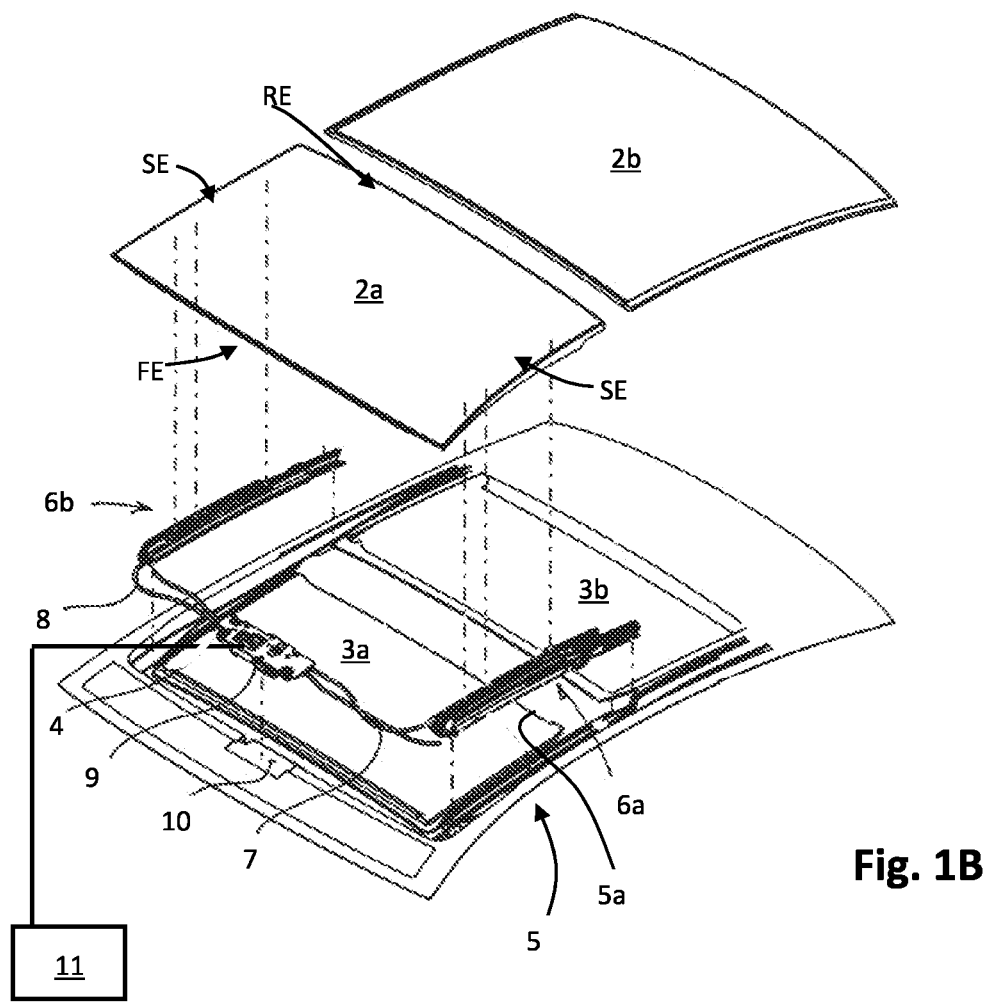
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control unit 11 is schematically illustrated and is operatively coupled to the electric motor 9. The control unit 11 may be any kind of processing module, either a software controlled processing module or a dedicated processing module, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figure 2A:
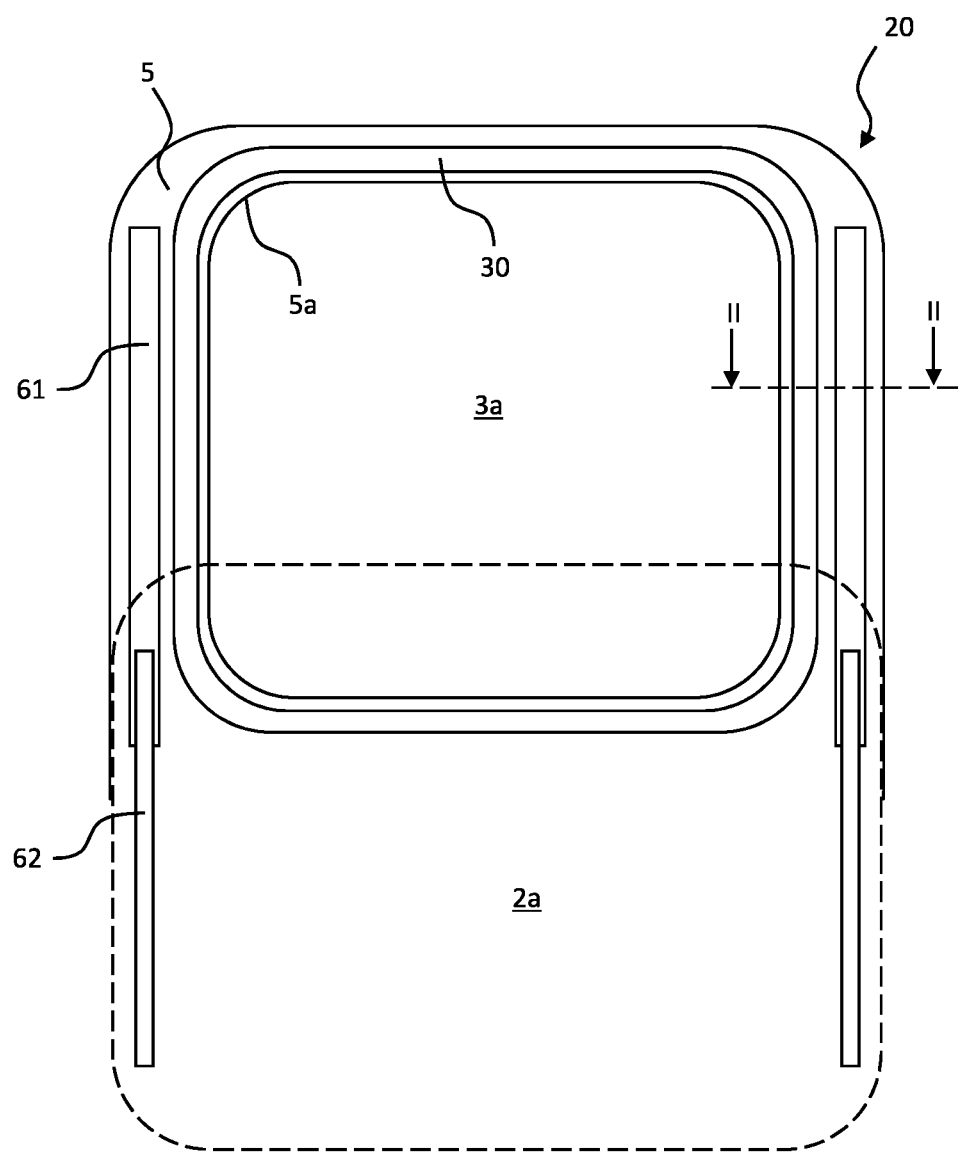
FIG. 2A shows a top view of a first embodiment of an open-roof assembly comprising a pressure-sensitive sensor device.

FIG. 2A shows an open-roof assembly 20 in the open state. The open-roof assembly comprises the frame 5, in which the opening 3a is provided, and the moveably arranged closure member 2a is slid away to uncover the opening 3a. The closure member 2a is supported on the frame 5 by a suitable guide assembly comprising a stationary element 61 mounted on the frame 5 and a movable element 62, slidably supported by the stationary element 61. The movable element 62 is mounted on the closure member 2a such that the closure member 2a is slidably mounted. Usually, the moveable element 62 and closure member 2a are tiltable for lifting the closure member 2a out of a plane of the vehicle roof, when moving from the closed state to the open state, as above described in relation to FIGS. 1A and 1B.

The frame 5 comprises a frame edge 5a forming a perimeter of the opening 3a. A compressible seal 30 is arranged around the perimeter, close to the frame edge 5a.

Figure 2B:
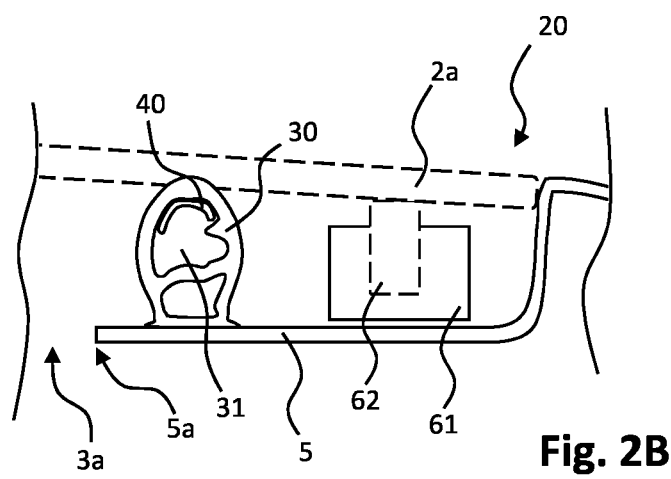
FIG. 2B shows a cross-section of the first embodiment along line II-II of FIG. 2A.

A cross-section of the open-roof assembly 20 of FIG. 2A along line II-II is shown in FIG. 2B. In FIG. 2B, the open-roof assembly 20 is illustrated in the closed state. In the closed state, the closure member 2a is in contact with the compressible seal 30. The compressible seal 30 removes the guide assembly from view from a passenger compartment and reduces noise entering the passenger compartment of the vehicle.

Referring to FIGS. 2A and 2B, the compressible seal 30 is provided with a pressure-sensitive sensor device 40 arranged in an internal channel 31 of the compressible seal 30. For example, the pressure-sensitive sensor device 40 is embodied as a strip-shaped sensor comprising a reference strip and a sliding strip, separated from each other by a spacer. The reference strip and the sliding strip have electrodes located thereon. Bending of the sensor results in shifting of the sliding strip with respect to the reference strip and thus shifting of the electrodes relative to each other. Measurements obtained from the electrodes show such shifting. Due to the presence of multiple electrodes, a location of the exerted pressure is detectable and a local deformation can be derived from the measurements. Such a sensor is described in more detail in US2020124397, for example. In another embodiment, another kind of sensor device may be applied equally well. For example, a capacitive measurement or contact detection (e.g. a switch) based sensor device may be used, wherein such sensor device is configured to detect locally applied pressure and to detect the location of the applied pressure.

The pressure-sensitive sensor device 40 is thus arranged between the closure member 2a and the frame 5 for detecting presence of an object between the closure member 2a and the frame 5. In particular, when an object is trapped between the closure member 2a and the frame 5, pressure is applied on the compressible seal 30. Such pressure and its location is detected by the pressure-sensitive sensor device 40, which may supply a corresponding detection signal to a control unit (cf. control unit 11 of FIG. 1b; not shown in FIGS. 2A and 2B). The control unit may be configured to respond to such detection signal by controlling a movement of the closure member 2a, such as stopping a movement, reversing a movement, starting a movement, changing a speed of movement, and the like. As described in more detail hereinafter in relation to the embodiment of FIG. 5, the control unit may perform other operations as well in response to the detection signal.

Figure 3A:
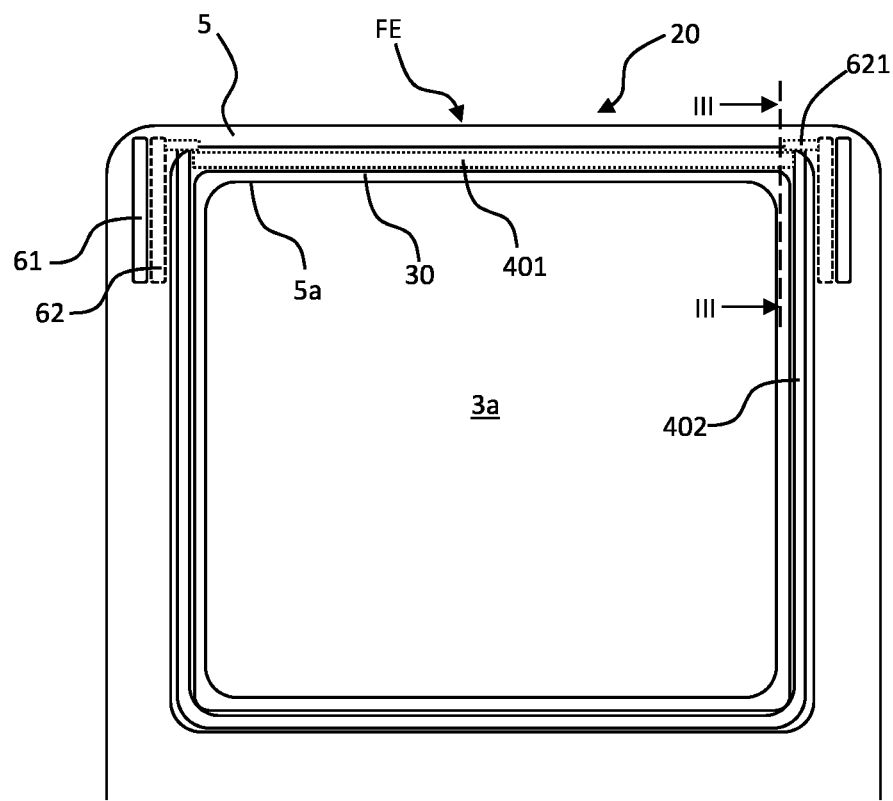
FIG. 3A shows a top view of a second embodiment of an open-roof assembly comprising a pressure-sensitive sensor device.
Figure 3B:
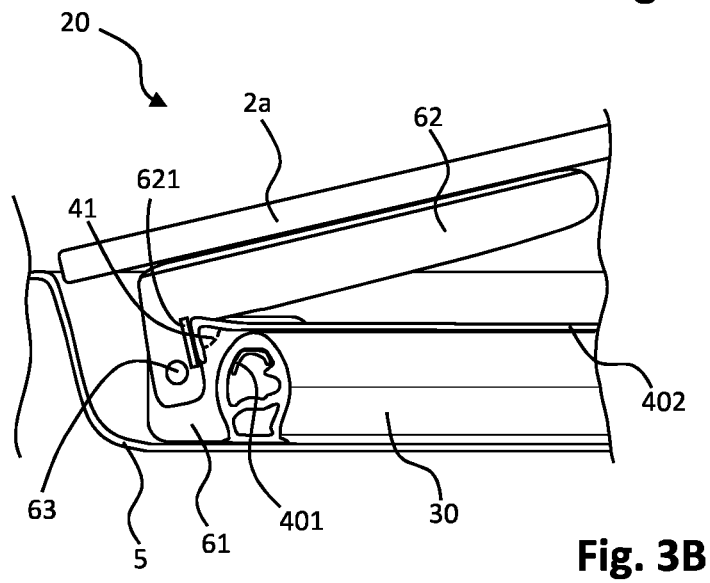
FIG. 3B shows a cross-section of the second embodiment along line III-III of FIG. 3A.

FIGS. 3A and 3B illustrate a second embodiment of an open-roof assembly 20, wherein the closure member 2a (not shown in FIG. 3A for clarity) is tiltably (hingably) mounted. A stationary element 61 of a guide assembly is mounted on the frame 5 and a moveable element 62 is coupled to the stationary element 61 through a hinge 63. The moveable element 62 comprises a protruding arm 621, which extends over the compressible seal 30. The closure member 2a is attached to the moveable element 62 such that the closure member 2a may rotate around the hinge 63.

A first pressure-sensitive sensor device 401 is integrated in the compressible seal 30 at a position of the front end (FE) of the closure member 2a. A second pressure-sensitive sensor device 402 is arranged on top of a large part of the remainder of the compressible seal 30. Further, each end of the second pressure-sensitive sensor device 402 is attached to the protruding arm 621 of the moveable element 62. At least the second pressure-sensitive device 402 is configured to detect a deformation such that the second pressure-sensitive device 402 is configured to detect an angle 41 between the protruding arm 621 and an upper surface of the compressible seal 30. When the hingable closure member 2a is in the closed state, the angle 41 corresponds to a substantially right angle. In the open state, the angle 41 will be become an acute angle. The detected angle 41 may be used by a control unit to control the operation of the opening and closing of the closure member 2a, wherein the detected angle 41 represents a position of the closure member 2a.

As apparent to those skilled in the art, the pressure-sensitive sensor device 402 configured to detect a deformation may be used solely for detecting a position of the moveable closure member 2a, in which case the pressure-sensitive sensor device 402 may be embodied as a short strip extending between the compressible seal 30 (or any other element stationarily attached to or part of the frame 5) and the closure member 2a. Further, there may be provided one such a short strip or two, one at each hinge 63.

In the first and the second embodiments of FIGS. 2A, 2B, 3A and 3B, the pressure-sensitive sensor device 40 and the first and second pressure-sensitive sensor devices 401, 402 extend completely around the perimeter of the opening 3a. In another embodiment, only relevant parts of the perimeter may be provided with such a pressure-sensitive sensor device.

Figure 4:
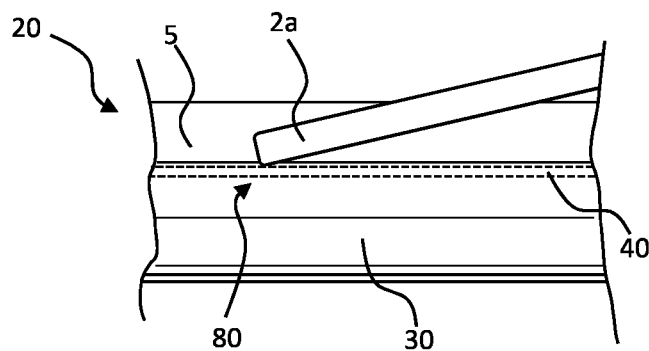
FIG. 4 shows a partial side view of a third embodiment of an open-roof assembly comprising a pressure-sensitive sensor device.

FIG. 4 illustrates an embodiment of an open-roof assembly 20, wherein the closure member 2a is slidably arranged. The pressure-sensitive sensor device 40 is shown to be arranged in the compressible seal 30, but may as well be arranged on the compressible seal 30 or may be arranged on or in any other element stationary mounted on the frame 5. In this embodiment, the closure member 2a or an element attached to the closure member 2a slides along the pressure-sensitive sensor device 40 such that the pressure-sensitive sensor device 40 detects a local pressure 80 that moves with the sliding movement of the closure member 2a.

In the embodiment of FIG. 4, a tip end of the closure member 2a slides over the compressible seal 30, thereby exerting the local pressure 80 on the pressure-sensitive sensor device 40. In another embodiment, a protruding element may be mounted on the closure member 2a, wherein the protruding element exerts the local pressure 80 on the pressure-sensitive sensor device 40. For example, a rotatable element, e.g. a roller or wheel, may be mounted on the closure member 2a such that the rotatable element rolls over the compressible seal 30, thereby reducing wear of the compressible seal 30 as compared to an element sliding over the compressible seal 30.

Detection of the position in accordance with the embodiment of FIG. 4 may be used as a feedback to a control unit controlling a movement of the closure member 2a. Other parts or elements known from the prior art for detecting a position or a speed of movement may, optionally, be omitted in such embodiment.

Figure 5:
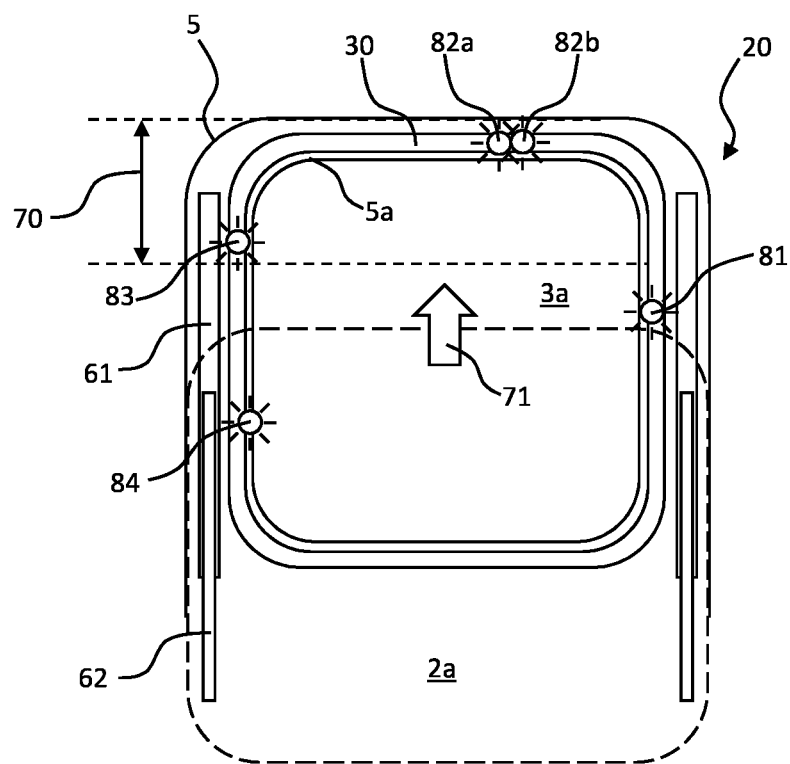
FIG. 5 shows a top view of a fourth embodiment of an open-roof assembly comprising a pressure-sensitive sensor device.

FIG. 5 shows an embodiment similar to the embodiment of FIGS. 2A and 2B. Further, an anti-trap zone 70 is shown and arrow 71 indicates a closing movement direction. In the closing movement direction the closure member 2a moves from the open position towards the closed position.

Further, in FIG. 5, a number of object touches are indicated, wherein an object touch corresponds to a local pressure exerted by an object on the pressure-sensitive sensor device integrated or embedded in the compressible seal 30. A first object touch 81 is indicated just in front of the closure member 2a, wherein it is assumed that the closure member 2a is moving in the closing movement direction 71. The first object touch 81 is outside the anti-trap zone and may therefore be regarded as not immediately leading to an entrapment. The closure member 2a may move further in the closing movement direction 71. In an embodiment, a speed of the movement of the closure member 2a may be reduced, a visible or audible warning signal may be provided, or the like. In an embodiment, it may be regarded a control signal from a user indicating that the closure member should stop and stay in its position.

A second object touch comprises two simultaneous second object touches 82a, 82b, e.g. two fingers tapping on the compressible seal 30, exerting pressure on the pressure-sensitive sensor device. Such a simultaneous dual object touch 82a, 82b may be recognized as a user command. In a control unit (not shown in FIG. 5) any specific command may be linked to such a user command, even in dependence of a position of the closure member 2a, for example. In a closed state, it may be interpreted as a user command for opening; in the open state, it may be interpreted as a user command for closing. Further, if the closure member 2a is moving, it may be interpreted as a user command for stopping such movement. Still, if the front edge (FE) of the closure member 2a is in the anti-trap zone 70 and the closure member 2a is moving in the closing movement direction 71, it may be regarded as a potential entrapment and the closure member 2a may be stopped and possibly reversed to a full open state or to an open state at a position where the front edge (FE) is just outside the anti-trap zone 70, for example.

A third object touch 83 is in the anti-trap zone 70. Depending on the state of the closure member 2a, i.e. whether the closure member 2a is closed, open, in stand-still or moving, the closure member 2a may be controlled to change its state. In a particular embodiment, the third object touch 83 may affect an anti-trap system or anti-pinch system that is based on an indirect detection. For example, based on an electrical current consumption of a motor driving the closure member 2a in relation to a position or speed of the closure member 2a, it may be determined that a movement of the closure member 2a is obstructed. Such an indirect detection system commonly uses a predetermined threshold such that, as soon as a particular parameter exceeds such threshold, a potential pinch is detected. The threshold is usually relatively high to prevent accidental, incorrect pinch detection, which may result in potentially relatively late detection, resulting in potentially relatively high forces exerted by the closure member 2a on the pinched object. If the third object touch 83 is detected in the anti-trap zone 70, the threshold may be lowered to detect an actual pinch sooner, thereby reducing a force exerted by the closure member 2a. Additionally or alternatively, a speed of the closure member 2a may be reduced. Further, an audible or visible warning signal may be provided.

A fourth object touch 84 is at a position below the closure member 2a. Entrapment of an object is not expected at such position of the fourth object touch 84. Therefore, the fourth object touch 84 may be interpreted as a user command and in a control unit one or more commands may be linked to such fourth object touch 84, e.g. depending on actual conditions, like a state of the closure member 2a, daylight or night-time conditions for operating a lighting device or a sunblind device, or any other command as apparent to those skilled in the art.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open-roof assembly for covering or at least partly uncovering an opening in a vehicle roof, the open-roof assembly comprising a frame defining the opening, a moveably arranged closure member and a pressure-sensitive sensor device,
- wherein the open-roof assembly comprises a closed state, in which the closure member covers the opening in the vehicle roof, and an open state, in which the closure member uncovers the roof opening at least partly,
- wherein the pressure-sensitive sensor device is arranged between the closure member and the frame for detecting presence of an object between the closure member and the frame, at least when the closure member is moving from the open state towards the closed state,
- wherein the pressure-sensitive sensor device extends over a sensor device length along at least one side of the opening and is configured to detect a location of a local pressure, which local pressure is exerted locally on the pressure-sensitive sensor device, along the sensor device length,
- wherein the pressure-sensitive sensor device is configured to detect a local deformation due to the local pressure exerted on the pressure-sensitive sensor device, and
- wherein the closure member is tiltably arranged and wherein the pressure-sensitive sensor device is arranged and configured to detect a hinge angle between the frame and the closure member.

2. The open-roof assembly according to claim 1, wherein the pressure-sensitive sensor device is integrated with a compressible seal arranged along a perimeter of the opening in the frame.

3. The open-roof assembly according to claim 1, wherein the pressure-sensitive sensor device is arranged such that an occupant of the vehicle is enabled to touch the pressure-sensitive sensor device in at least one of the closed state and the open state for operating at least one function of the open-roof assembly.

4. The open-roof assembly according to claim 1, wherein the open-roof assembly further comprises a control unit, the control unit being configured to control the open-roof assembly in accordance with an operating parameter and being configured to execute an indirect pinch detection, wherein the control unit is configured to adapt the operating parameter upon detection of a locally exerted pressure on the pressure-sensitive sensor device.

* * * * *